ature, or a time-temperature relationship. The combination is adapted to regulate migration of fluid from the fluid source to the wick material.

United States Patent
Manske

[11] 3,954,011
[45] May 4, 1976

[54] SELECTED TIME INTERVAL INDICATING DEVICE

[75] Inventor: Wendell J. Manske, Birchwood, Wash.

[73] Assignee: Minnesota Mining and Manufacturing Company, St. Paul, Minn.

[22] Filed: Oct. 10, 1973

[21] Appl. No.: 404,891

Related U.S. Application Data
[63] Continuation-in-part of Ser. No. 400,044, Sept. 24, 1973, abandoned.

[52] U.S. Cl. .................................. 73/356; 58/1 R; 116/114 V; 116/114 Y
[51] Int. Cl.² .................. G01K 11/16; G01K 11/06
[58] Field of Search .... 116/114 AM, 114 V, 114 Y, 116/114.5; 73/356, 358; 23/253 A; 426/88; 58/1 R

[56] References Cited
UNITED STATES PATENTS

| 3,006,313 | 10/1961 | Huyck et al. ............... 116/114 V |
| 3,243,303 | 3/1966 | Johnson .............................. 73/356 |
| 3,420,205 | 1/1969 | Morison ........................ 116/114 R |
| 3,479,877 | 11/1969 | Allen et al. ........................... 73/358 |
| 3,520,124 | 7/1970 | Myers .................................... 58/1 R |
| 3,521,489 | 7/1970 | Finkelstein et al. .................. 73/358 |
| 3,665,770 | 5/1972 | Sagi et al. ............................. 73/358 |
| 3,684,737 | 8/1972 | Emigh .................................. 73/356 |

OTHER PUBLICATIONS
Hawley, Gessner G., *The Condensed Chemical Dictionary*, 8th Ed., N.Y., Van Nostrand Reinhold, 1971, pp. 329, 884, 885.
Mial, L. M. et al., *A New Dictionary of Chemistry*, 4th Ed., London, Longman, 1968, p. 513.

*Primary Examiner*—James J. Gill
*Assistant Examiner*—Daniel M. Yasich
*Attorney, Agent, or Firm*—Alexander, Sell, Steldt & DeLaHunt

[57] ABSTRACT

Indicating device suitable for visibly measuring parameters such as time, temperature, and time-temperature relationships. The device includes a porous fluid carrying pad, a wick material for said fluid, and an indicator means whereby the progress of fluid along the wick material can be visibly indicated and used to measure the passage of time, the exposure to a given minimum temperature, or a time-temperature relationship. The combination is adapted to regulate migration of fluid from the fluid source to the wick material.

14 Claims, 10 Drawing Figures

SELECTED TIME INTERVAL INDICATING DEVICE

This application is a continuation-in-part of copending U.S. Patent application Ser. No. 400,044, filed Sept. 24, 1973 now abandoned.

The present invention relates to an improved indicating device adapted to measure the progress of fluid along a wick material, which progress can be determined and related to a particular time interval, a particular temperataure, or a particular time-temperature relationship. The invention also relates to means for controlling the selection of the time interval or the time-temperature interval which can be indicated.

These indicating devices are useful for attaching to perishable items to indicate the length of time they have been on the marketer's shelf. Aside from the application to various food products, other perishable or temperature sensitive items can carry the indicating device of the present invention. Photographic materials which must be used within a limited time after manufacture can have these chemical timers attached to the package and activated at the time of manufacture. A readily visible signal will appear when the materials have been in commerce for a given period of time.

The devices may, by proper selection of the liquid, be used to indicate exposure to a particular temperature and thus may be used with advantage in combination with temperature sensitive items, such as frozen foods, foods which require cooking, and the like.

Various devices used to indicate the passage of a predetermined interval of time are known in the prior art. Some of the chemical timing devices which are known have involved the exposure of a wick material to a free liquid source such as a pool of liquid, and have provided a chemical reagent in the wick at some predetermined point which reacted with the migrating liquid to change color. The liquid, wick material, and length of the wick are selected so as to provide a desirable time interval before the color change occurs.

U.S. Pat. No. 3,620,677, issued Nov. 16, 1971, to Morison teaches an indicator device suitable for detecting the passage of a predetermined time interval. This device comprises a fluid chamber with fluid therein, a wick material exposed to the fluid and an indicating means to detect the progress of the fluid along the wick. In addition, the indicating device is intimately sheathed by, and laminated to, an impervious covering to minimize the effects of the environment to which the device is exposed. The fluids which are used are aqueous liquids or water.

Similar constructions have been used as signal devices for determining if frozen food packages have been subjected to defrosting conditions prior to reaching the consumer. Devices of this type are shown by U.S. Pat. No. 2,560,537, issued July 17, 1951 to Andersen, and U.S. Pat. No. 2,951,764 issued Sept. 6, 1960 to Chase.

In addition U.S. Pat. No. 3,243,303, issued Mar. 27, 1966 to Johnson, teaches the use of an absorbent pad completely saturated with an aqueous, immobilized fluid as a fluid source in a freeze-thaw indicator.

Indicating devices which use pools of free liquid as a fluid source have many disadvantages. The use of a pool of free liquid inherently creates problems related to devising means to securely contain the liquid pool and means to separate the liquid from the wick prior to "starting" the timer. In some cases, as in the frozen food indicators shown in the aforementioned patents to Andersen, Chase, and Johnson, freezing the liquid has been expedient. However, this poses problems in the manufacture of the device in that the device must be immediately frozen or the liquid introduced at some later time just prior to freezing. Moreover, this method is not convenient for devices which are intended for room temperature operation. The use of a free pool of liquid also provides a constant driving force which cannot be controlled to provide slower or faster liquid migration rates so that if a long time interval must be indicated, a very large wick is required. This introduces further complications in the design of chemical timing devices.

It has now been found that the disadvantages of the aforementioned indicating devices can be overcome by the practice of the present invention. More particularly, the present invention provides a simple indicating device that can be handled, stored and used as simply as a compact pad of paper.

This new device comprises in combination a fluid source comprising a wettable porous matrix carrying a fluid saturant, preferably a liquid saturant, a wick material capable of wicking the saturant from the matrix, and means for regulating migration of fluid from the fluid source to the wick material, and wherein the indicating device further includes means for indicating the presence of fluid saturant in the wick.

In one presently preferred embodiment, the device is a dry appearing, storage stable indicating device comprising, in combination, a generally flat porous pad containing a liquid source, a flat wick, and a barrier layer adapted to prevent migration of liquid from the porous pad to the wick material, said barrier layer being impervious to said liquid saturant and being removably interposed between said wick and said pad, and means interconnecting said pad, wick and barrier layer in layers and biasing said pad and wick toward one another so that they contact one another upon removal of said barrier layer and wherein said device further includes means for indicating the presence of liquid saturant in the wick.

In yet another preferred embodiment, the indicating device comprises in combination a generally flat porous pad containing a liquid source, a flat wick, and means supporting said wick and said pad and adapted to maintain these elements in fixed spatial relation such that no migration of liquid from the pad to the wick will occur until said supporting means is deformed or acted upon so as to cause said pad and said wick to be brought into intimate contact, said supporting means being adapted to maintain said pad and said wick in intimate contact. Said device further comprises means for indicating the presence of liquid saturant in the wick.

A preferred means of indicating the presence of the fluid saturant in the wick comprises providing an indicating means along the wick so as to detect the presence of the migrating fluid saturant along the wick or at such place or places on the wick provided with said indicating means. This may be done my means of a chemical reactant which reacts with the fluid saturant to produce a visible color change in or on the wick. Alternatively, the fluid saturant may have a coloring component dissolved therein so that the progress of the colored fluid saturant along the wick can be observed. The wick may have indicia marked at predetermined intervals along its length to aid in observing the progress of the fluid saturant.

The invention will now be described in greater detail with reference to the accompanying drawings wherein.

Figure 1:
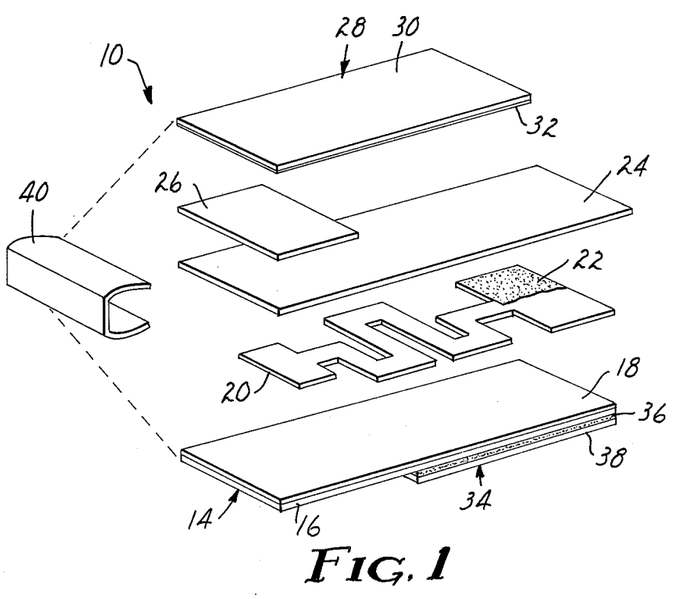
FIG. 1 is an isometric exploded view of the elements of an indicator device.
Figure 2:
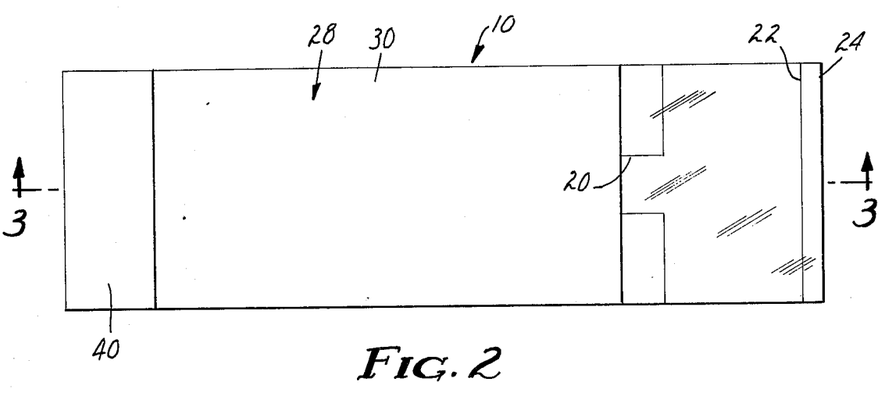
FIG. 2 is a top view of an assembled indicator device.
Figure 3:
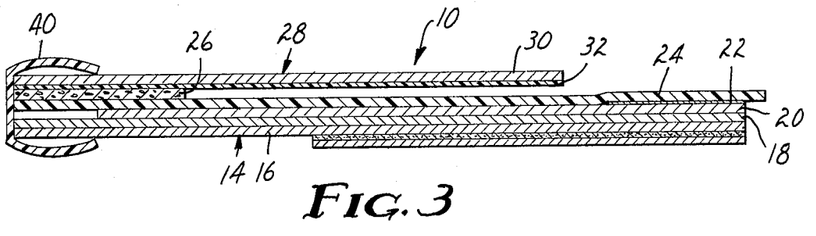
FIG. 3 is a cross-sectional view along line 3—3 of the assembled indicator device shown in FIG. 2.

To more clearly illustrate the invention, reference is made to the selected embodiment shown in FIGS. 1, 2 and 3 wherein device 10 has a lower cover means 14 comprising a paperboard cover 16 provided with an impervious cover liner 18. Overlying and adhered to cover 14 is wick 20 having coated on a portion thereof a chemical reactant layer or impregnant 22. A transparent plastic separator sheet 24 overlies wick 20 and is interposed between wick 20 and fluid source pad 26 containing a liquid saturant so as to prevent the migration of liquid from pad 26 into and along wick 20. Upper cover means 28 comprises paperboard cover 30 and impervious cover liner 32 and overlies and is substantially in register with lower cover means 14. Attaching means 34 is shown adhered to the outside of lower cover means 14 and comprises a pressure-sensitive adhesive layer 36 and removable protective liner 38. Retaining clip 40 fits over upper and lower cover means 28 and 14 to maintain the elements of the device in fixed relation and biases the fluid pad 26 toward wick 20 so that they contact one another upon removal of separator sheet 24.

Figure 4:
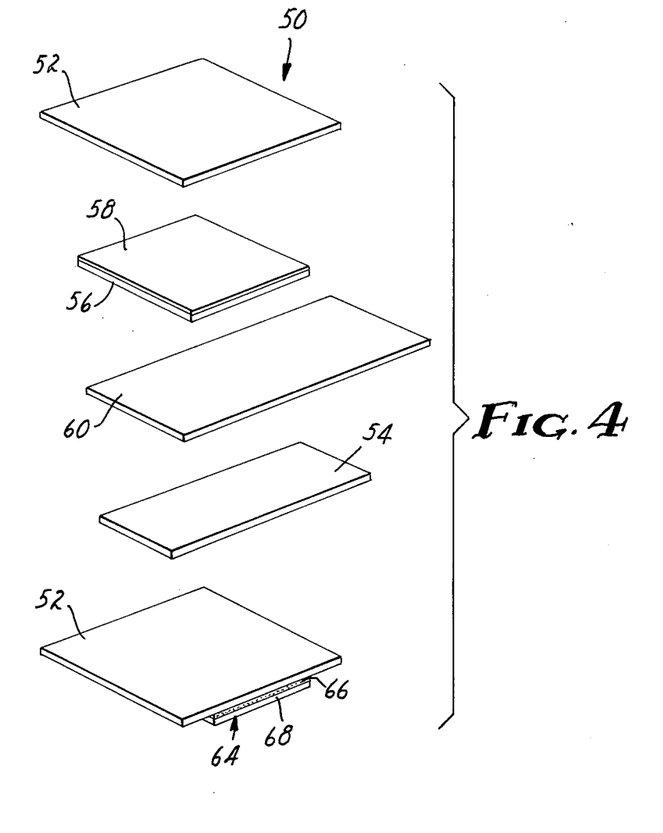
FIG. 4 is an isometric exploded view of an alternative embodiment of an indicator device.

In the alternate embodiment shown in FIG. 4 device 50 comprises a pair of flexible transparent cover means 52 substantially in register with each other. Located between covers 52 are fluid source pad 54 carrying a liquid saturant material and wick 56 having chemical reactant layer 58. Interposed between said wick 56 and fluid source pad 54 is an impervious separator sheet 60 which can be removed to allow contact between pad 54 and wick 56. As is shown in the sectional end view in FIG. 5, a fastening means such as staples are used to hold the elements 54, 56 and 60 in fixed relation between covers 52, and also causes fluid source pad 54 and wick 56 to be biased toward one another so that on removal of separator sheet 60 the pad 54 and wick 56 will be brought into contact with one another. Attaching means 64 is shown adhered to cover 52 and comprises pressure-sensitive adhesive layer 66 and removable protective liner 68. Yet another embodiment of the present invention is shown in FIGS. 6, 7 and 8. FIG. 6 shows a top view of the elements of a time-temperature indicating device 70 which comprises a poly coated paperboard lower cover 72. Overlying said lower cover 72 and adhered thereto are a plurality of fluid source pads 74a, 74b, 74c and 74d carrying liquid saturant materials having differing melting points such that for example the liquid saturant in pad 74d is liquid at room temperature, while the liquid saturants in pads 74a–b are solid at room temperature having melting points at differing elevated temperatures. Overlying said pads and in register with lower cover 72 is impervious separator sheet 76. A poly coated paperboard upper cover 78 has adhered to the underside thereof a wick designated generally as 80. Wick 80 comprises a plurality of paths or branches leading from a common indicating portion 82 having a chemical reactant layer or impregnant portion 84. The wick paths or branches terminate in fluid pad contacting means 86a–d. The wick 80 is adhered to the underside of upper cover 78 such that the indicating portion 82 of wick 80 is in registry and visible through window 88 of cover 78. Cover 78 and wick 80 are then juxtaposed over lower cover 72 and separator sheet 76 such that pad contacting means 86a, 86b, 86c and 86d are in register with fluid source pads 74a, 74b, 74c and 74d, respectively. Steel pressure plates 90 overlay the outer surface of covers 72 and 78 and in combination with a metal tightening strap 92 and a screw 94 as shown in FIGS. 7 and 8 are used to maintain the elements of device 70 in fixed relation and serve to bias pads 74a–d toward wick 80, such that removal of separator sheet 76 causes wick portions 86a, b, c, and d, to contact pads 74a, b, c and d, respectively.

Figure 9:
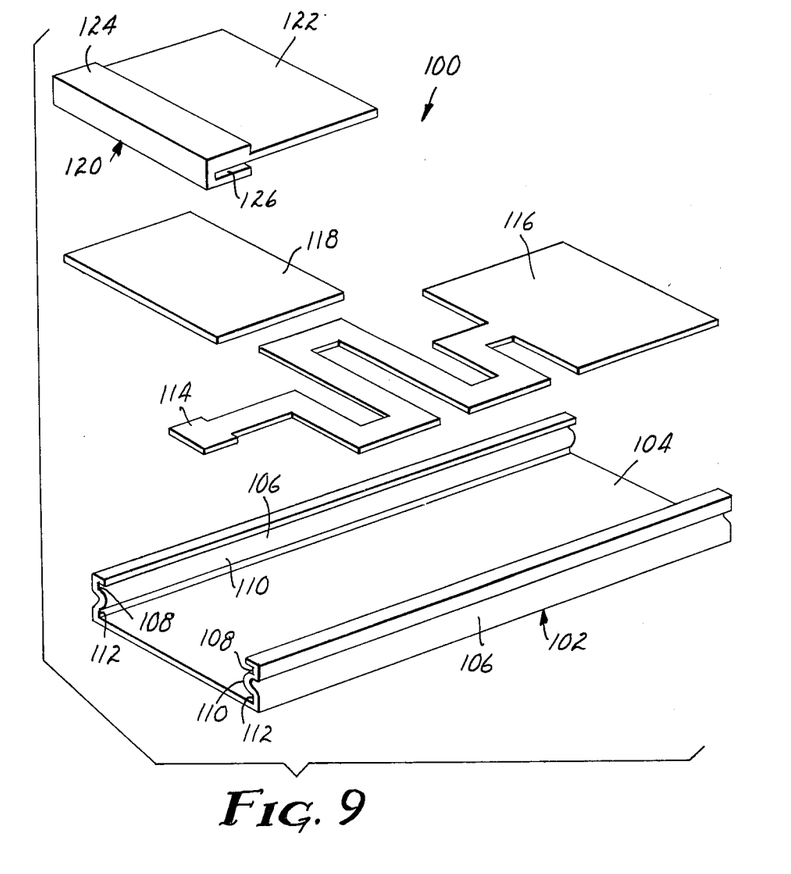
FIG. 9 is an exploded view of an additional embodiment of an indicating device.
Figure 10:
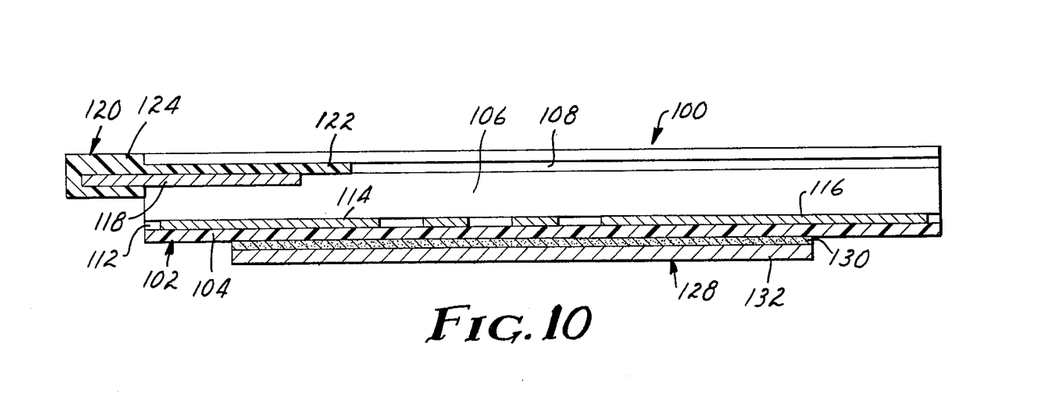
FIG. 10 is a transfer section of the assembled indicating device shown in FIG. 9.

An additional embodiment is shown in FIGS. 9 and 10. FIG. 9 shows an exploded view of an indicating device 100 comprising a channel shaped carrier 102 which comprises a base 104 and upwardly extending side walls 106 disposed along opposite edges of said base. The walls have an undulating shape defining upper grooves 108, extended central portions 110, and lower grooves 112. The carrier 102 is preferably constructed of a stiff material having sufficient flexibility so that walls 106 can be deflected outward with moderate hand pressure. Wick 114 is seated on base 104 and is generally cut from blotter paper stock having a straight or tortuous path and an indicating area 116 located so that the presence of fluid saturant therein is indicative of the passage of a predetermined time interval. A porous matrix 118 carrying a fluid saturant absorbed therein (not shown) is associated with matrix holder 120. Matrix holder 120 comprises upper protective cover portion 122 and enlarged end portion 124 including slot 126 into which porous matrix 118 can be inserted and retained in underlying relation to cover portion 122.

FIG. 10 shows a transfer section of the assembled device shown in FIG. 9 with the addition of attaching means 128 which comprises pressure sensitive adhesive layer 130 and removable protective liner 132.

The operation of the indicating device of the present invention can be most clearly understood by reference to the drawings. FIG. 1 shows the major components of a chemical indicating device. The device is assembled as in FIG. 3 after a liquid saturant containing a color-forming coreactant chemical dissolved therein is added to porous pad 26. Clip 40 holds the elements tightly together. When the device is to be activated, separator sheet 24 is pulled free of the assembly, thus allowing porous pad 26 to contact wick 20. Clip 40 aids in maintaining firm and intimate contact between pad 26 and wick 20 so that the liquid saturant in pad 26 can migrate into and along the wick 20. After a period of time, the liquid saturant reaches the chemical coreactant portion 22 of the wick 20 and the chemical reactant dissolved in the liquid saturant reacts with chemical portion 22 to produce a colored material indicating the passage of a predetermined interval of time.

Figure 5:
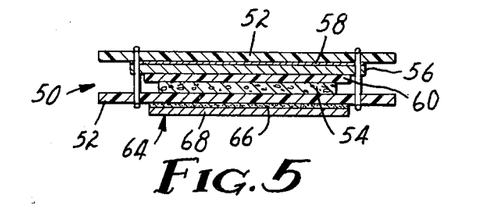
FIG. 5 is a cross sectional end view of the assembled indicator device shown in FIG. 4.
Figures 6, 7, 8:
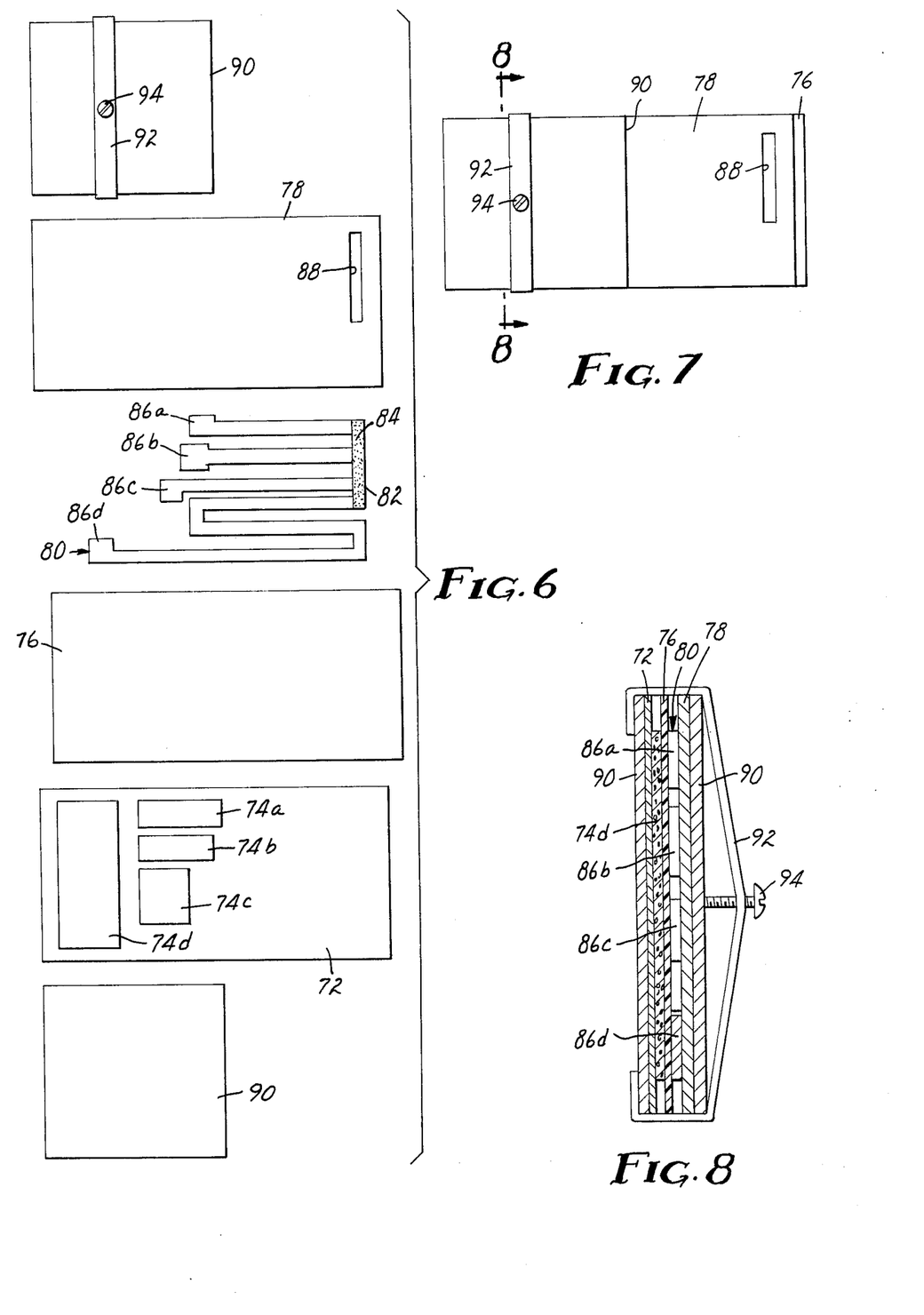
FIG. 6 is an exploded top view of a time-temperature indicating device.
FIG. 7 is a top view of the assembled device shown in FIG. 6.
FIG. 8 is a cross sectional view taken along line 8—8 of FIG. 7.

In the alternative embodiment shown in FIGS. 4 and 5, porous pad 54 is allowed to absorb a liquid saturant containing a color forming coreactant chemical dissolved therein, and the components are then sandwiched between protective transparent covers 52, as shown in FIG. 5, such as by stapling the covers tightly together at their edges with staples.

When the device is to be activated, separator sheet 60 is pulled free of the assembly, thus bringing the porous pad 54 carrying the liquid saturant into intimate contact with wick material 56. The liquid saturant is thereby caused to migrate through porous wick material 56 and eventually contacts layer 58, whereby a colored material is formed which is visible through transparent cover liner 52. The appearance of the colored material indicates the passage of a predetermined time interval.

Indicating devices of the structure shown in FIGS. 4 and 5 are also particularly useful for indicating exposure to a particular temperature. Thus, by choosing a liquid saturant material which is solid at temperatures at which frozen foods are stored but becomes liquid at temperatures at which the food is thawed, e.g. room temperature, a device which indicates when a frozen food is thawed can be provided. The device can be attached to the packaged food and after the food is frozen, the separator sheet 60 is removed. When the food thaws, the saturant material becomes liquid, flows through wick 56 and reacts with layer 58 to form a colored material, thus indicating the food has been thawed. If the food is refrozen, the color remains to warn the consumer that the food has been thawed. By choosing saturant materials having suitably different melting points, the device can effectively operate as a temperature indicator for various temperatures. Proper selection of wick dimensions, especially thickness, can influence the time interval indicated and thus the device can be used to indicate a heat history, i.e. whether or not an article has been exposed to a given minimum temperature for a given period of time.

Devices of the type shown in FIGS. 6–8 are particularly suited for attaching to articles which are sensitive to elevated temperatures or room temperature, and which sensitivity increases with increasing temperature such as photographic film and the like. For example, an article may be able to tolerate 72 hours exposure to room temperature before deteriorating, but may only be able to tolerate 48 hours at 90° F. or 8 hours at 100° F. A device as shown in FIGS. 6–8 can indicate whether an article of this type has been exposed to a debilitating heat history. This is accomplished by selecting the liquid saturant materials carried in the porous fluid source pads 74$a$, $b$, $c$ and $d$, such that each has a different melting point, for example 150°, 100°, 90°, and 50° F. The path length for each branch of wick 80 is chosen such that the time taken for the liquid to travel along a given branch of the wick at a given temperature is the same as the time the article can withstand that temperature. For example, using liquid saturants having the above noted melting points in pads 74$a$, $b$, $c$, and $d$, respectively if the timer is activated at 32° F., no liquid migration occurs. If the temperature reaches 75° F. the first material becomes liquid and migrates into portion 86$d$ of wick 80 and reaches indicator portion 82 in 72 hours. If the temperature reaches 95° F., the saturant in pad 74$c$ becomes liquid, migrates through 86$c$ of wick 80, and reaches indicator portion 82 in 48 hours. Even higher temperatures will cause indicator portion 82 to change color in a shorter time interval.

The device shown in FIGS. 9 and 10 is a particularly simple and convenient device. When assembled as shown in FIG. 10, the device is inactive and can be easily stored and handled. When it is desired to activate the device, top cover 122 and lower carrier means 102 are squeezed together, forcing walls 106 to flex outwardly and allow the movement of cover 122 toward wick 114, thereby contacting wick 114 with matrix 118. Matrix 118 and overlying top cover 122 are biased toward wick 114 by pressure exerted by groove 112 in resilient wall 106. Alternatively, top cover means 122 and underlying matrix 118 can be removed from upper groove 108 and inserted in lower groove 112 wherein the matrix and wick are brought into intimate contact and maintained therein by pressure from the resilient walls 106.

The intimate contact between matrix 118 and wick 114 allows migration of the fluid from matrix 118 into and along wick 114. The fluid generally is visibly colored by a dye contained therein, and thus the progress of the migrating fluid front can be observed. The time-distance relationship for a given liquid and wick combination can be determined and can be used to design devices which correlate the passage of a given time interval with a particular location of the fluid front along the wick.

The indicating devices of the present invention are particularly adapted to measure the passage of a given interval of time or a given interval of time at or above a minimum temperature or exposure to a given temperature. This is accomplished in the present invention by providing a unique combination of elements comprising a source of fluid in contact with a wick material and by measuring the progress of liquid migrating along the wick and correlating this progress with the passage of time.

The fluid in the fluid source, by virtue of the fluid concentration gradient between the source and the wick, will be caused to migrate along and through the wick progressively with time. The time the fluid takes to travel a given distance will vary, depending on various influencing factors, e.g. temperature, fluid concentration in source, wick material, properties of fluid, etc. This time-distance relationship can be determined for a given set of materials and conditions and can be used to design and calibrate devices which will perform the function of a chemical timer. In order to detect the presence of the liquid in the wick, an indicating means is necessary. In one preferred embodiment this indicating means may be an element located at a given distance along the wick to detect the presence of fluid, preferably by some visible means. A preferred indicating means is a chemical which is reactive with the migrating fluid or component thereof to form a visibly colored material. This reactive indicating component may be a separate element or may be a portion of the wick itself which has been impregnated or coated with the color-reactive component. Alternatively, the indicating means may be simply a visible dye dissolved in or carried by the migrating fluid. The dye preferably imparts a color to the fluid which contrasts with the color of the wick material so that the fluid front is readily visible.

The device is adapted to regulate or prevent migration of fluid from the fluid source to the wick during storage of the device prior to use. This can be accomplished by means which provides a removable impervious physical barrier between the fluid source and the wick. At the beginning of the time interval to be indicated, the separating means is removed and the fluid source brought into contact with the wick. This induces migration of the fluid along the wick and, in effect, "starts" the chemical timer. Alternatively, means can be provided which maintains the wick and fluid source spaced apart from one another during storage, but which is adapted to allow these elements to subsequently be brought into contact, and maintained in said contact. The device shown in FIGS. 9 and 10 exemplifies this method of construction.

The combination of elements which comprise the indicators of the present invention can be held and maintained in fixed relationship by binding means such as by sandwiching said elements between covers of stiff paperboard or plastic sheets or other binding or supporting means. A sheet of pressure-sensitive adhesive having a removable liner thereon can be affixed to the outside of one of the covers. This allows attaching the device to a surface such as an article of commerce so that the device will follow and be exposed to whatever environmental history, such as temperature, that the article is exposed to. In addition, this allows attaching the device to a location convenient to the eye as a visible reminder of the passage of a preselected interval of time.

Legends can also be printed on the surface of the device to denote the time interval which the device indicates or to convey advertising, instruction and the like.

By varying the shape and materials of construction of the indicating device, the time interval which is indicated by the device can be varied as desired as will be more fully detailed hereinafter.

The fluid source in the present invention may be any source or material which presents a fluid front at the operating temperatures and which is free to migrate as by a wicking mechanism at the desired temperature, but which is retained in the fluid source such that it will not pour, run, drip or otherwise flow as would a pool of free liquid. the preferred source comprises a porous wettable matrix carrying a fluid saturant. As used herein the term saturant merely refers to an absorbed or contained liquid and does not imply that the matrix is necessarily saturated with fluid since the present invention contemplates both saturated and unsaturated matrices as will be described hereinafter. The use of a fluid saturant carried in a porous matrix overcomes many of the difficulties of the prior art devices using a pool of free liquid. The use of a porous matrix carrying a fluid saturant allows construction of a device which is substantially flat and easily handled and stored without fear of leakage or spillage. The problem of designing a means to prevent or regulate migration of the liquid from the matrix to the wick prior to use is simplified.

The use of the fluid source of the present invention offers other advantages over a pool of free liquid. The driving force for the fluid to migrate along the capillary material or wick is a function of concentration. For a pool of free liquid the concentration is constant and is fixed. In contrast to devices using a free pool of liquid, the fluid source of the present invention has the capability of providing a variable driving force since in effect the porous matrix material "dilutes " the fluid saturant contained in the matrix. By increasing the amount of fluid carried in the matrix, the driving force influencing the migration of the fluid into and along the wick is increased and the fluid will migrate along the wick at a faster rate than if the matrix contained relatively less fluid.

As the fluid migrates into and along the wick material, the concentration of the fluid in the matrix will decrease. This in turn results in a decrease of the driving force. The use of a relatively large fluid source with large amounts of fluid carried therein will minimize the variation of driving force with time, while the use of a smaller matrix having relatively small amounts of fluid carried therein will result in greater variation of driving force with time.

In any event, this phenomenon can be used to advantage to vary the time interval which is to be measured. Depletion of fluid in the matrix due to migration into the wick can be used to make a compact design which slows down with time due to this depletion effect. Thus, relatively small devices which measure long time intervals can be constructed; whereas, prior art devices using free fluid as a liquid source generally require unusually long or bulky wicks to measure long time intervals, since they must absorb greater amounts of liquid over the same time interval.

The fluid saturant portion of the fluid source can be any material which is a fluid or becomes a fluid at the temperatures at which the timing device is to be operative and which can dissolve or carry a colored substance, a color-forming chemical substance, or be colored itself. Preferred fluids are non-aqueous materials which are liquid at temperatures at which the indicating device is to operate. In addition, the liquid preferably is one which has a relatively low vapor pressure at the operating temperatures in order to minimize evaporation before and during use. As a general rule liquids having a boiling point above that of water are most desirable; however, liquids with higher vapor pressures can prove useful under certain conditions. Especially preferred liquids are liquid organic phosphate esters or mixtures thereof. A particularly preferred liquid system is a 50:50 mixture of tributyl phosphate and trioctyl phosphate.

The porous matrix material employed in the fluid source can be any porous matrix material which can absorb or entrap the liquid and which will allow the liquid to migrate into the wick when contacted by the wick. The preferred matrices of the present invention are fibrous materials made from woven or non-woven natural or synthetic fibers. Cellulosic materials, as for example Kraft blotter papers, are particularly desirable. Ordinary bond paper may be used for many applications as may be films or papers or nonwoven fabrics made from synthetic fibers. The physical dimensions of the matrix material can be varied as desired to conform to a particular design requirement or to provide a particular amount or concentration of fluid in the matrix.

Generally the same materials which are suitable for use as the porous matrix are suitable for use as the wick material. It is preferred that the material be self-supporting so as to maintain a fixed geometric shape in order that points on the wick remain in fixed relationship.

An indicating means is necessary to determine whether, or to what extent, migration of the liquid saturant has taken place. A suitable indicating means is a dye dissolved in or carried by the fluid saturant in the matrix. By appropriate selection of a contrasting dye color the progress of fluid migrating from the porous matrix into the wick can be visibly noted. If desired, the wick can have printed thereon indicia to aid in visibly indicating the progress of the fluid and the correlative passage of time.

alternatively, a color producing chemical coreactant system may be employed as the indicating means in the present invention. This can be accomplished, for example, by dissolving one of the coreactant pair in the fluid saturant contained in the porous matrix and additionally coating or impregnating the wick material at a predetermined distance from the porous matrix with the second color producing coreactant chemical. When the liquid saturant has migrated the predetermined chemical can be located at a predetermined point on the wick such that the presence of the migrating liquid at said point, and the simultaneous color formation, indicates the passage of a given interval of time.

In one embodiment, the timer comprises a porous matrix prepared from a piece of 20 mil thick "Bluebird Blotting Paper" (Sorg Paper Co.) havng absorbed therein a 6 percent solution of N,N'-bis-(2-octanoyloxyethyl) dithiooxamide (DOEDTO) dissolved in a 50:50 mixture of tributyl phosphate:trioctyl phosphate. The wick is a ½inch wide strip of 20 mil Bluebird Blotting Paper. On removal of the separating sheet, the liquid migrates along the wick. Table I shows the effect of concentration of liquid in the matrix on the migration rate along the wick measured at room temperature (75° F.).

TABLE I

CONCENTRATION EFFECT
INCHES PENETRATION FROM FLUID SOURCE (exposure at 75° F)

| TIME HOURS | | 5 | 10 | 40 | 70 | 100 | 200 | 300 | 400 | 500 | 600 | 700 | 800 | 900 | 1000 | 1100 | 1200 | 1300 | 1400 |
|---|---|---|---|---|---|---|---|---|---|---|---|---|---|---|---|---|---|---|---|
| 100% FLUID — NO PAD | | 5.7 | 8.3 | 17.1 | 23.0 | | | | | | | | | | | | | | |
| CONCENTRATION OF FLUID IN THE SOURCE PAD AT START OF TEST AND (AT FINAL READING) Parts Liquid/ Parts Pad | 49/51 (46/54) | 4.7 | 6.8 | | | 16.3 | 20.1 | 22.5 | | | | | | | | | | | |
| | 45/55 (42/58) | 2.6 | 3.8 | | | 11.0 | 14.6 | 17.6 | 20.0 | 22.1 | | | | | | | | | |
| | 40/60 (37/63) | 1.5 | 2.4 | | | 8.3 | 11.5 | 14.0 | 16.0 | 17.7 | 19.3 | 20.7 | 21.9 | | | | | | |
| | 35/65 (32/68) | 1.1 | 1.7 | | | 6.2 | 8.7 | 10.7 | 12.2 | 13.6 | 14.8 | 15.9 | 16.9 | 17.8 | 18.7 | 19.5 | 20.1 | 20.7 | |
| | 30/70 (28.2/71.8) | 0.4 | 0.6 | | | 4.1 | 6.1 | 7.6 | 8.9 | 10.0 | 11.0 | 12.0 | 12.9 | 13.7 | 14.4 | 15.0 | 15.6 | 16.2 | 16.8 |
| | 25/75 (23.7/76.3) | 0.3 | 0.5 | | | 3.1 | 4.6 | 5.9 | 6.8 | 7.6 | 8.4 | 9.0 | 9.6 | 10.1 | 10.6 | 11.1 | 11.6 | 12.0 | 12.4 |
| | 20/80 (19.1/80.9) | 0.2 | 0.4 | | | 2.2 | 3.2 | 4.0 | 4.7 | 5.4 | 6.0 | 6.4 | 6.8 | 7.2 | 7.6 | 7.9 | 8.2 | 8.5 | 8.7 |
| | 15/85 (14.6/85.4) | — | — | | | 0.5 | 1.0 | 1.4 | 1.7 | 2.0 | 2.3 | 2.6 | 2.9 | 3.1 | 3.2 | 3.4 | 3.5 | 3.7 | 3.8 |
| | 10/90 (9.8/90.2) | — | — | | | 0.1 | 0.4 | 0.7 | 0.9 | 1.1 | 1.2 | 1.3 | 1.4 | 1.5 | 1.6 | 1.6 | 1.7 | 1.8 | 1.8 | distance along the wick, the chemicals react to produce a visible color, indicating the passage of a given time interval. Chemical coreactant systems which form colored chemical complexes are well known. A useful system comprises dithiooxamide or N,N'-diorgano substituted derivatives of dithiooxamides as one of the chemical coreactants and a metal salt such as nickel rosinate as the other coreactant. These materials react to provide a characteristic purple colored complex. A preferred coreactant system comprises N,N'-bis-(2-octanoyloxyethyl) dithiooxamide as the first coreactant (generally dissolved in the liquid saturant), and nickel rosinate as the second coreactant chemical (generally applied to the wick). As noted previously, the second It can be seen from the above Table that time intervals of varying length can be equated to the distance along the wick through which the fluid has migrated and used to design timers for indicating various time intervals.

The effect of temperature on a system similar to that shown above wherein the fluid concentration in the source pad is about 45 percent by weight is shown in Table II.

TABLE II

TEMPERATURE EFFECT
PARTS LIQUID/PARTS PAD = 45/55
INCHES PENETRATION FROM FLUID SOURCE PAD

| TIME HOURS | 5 | 10 | 20 | 30 | 40 | 50 | 60 | 70 | 80 | 90 | 100 | 200 | 300 | 400 | 500 | 600 | 700 | 800 | 900 | 1000 |
|---|---|---|---|---|---|---|---|---|---|---|---|---|---|---|---|---|---|---|---|---|
| TEMPERATURE °F. 100 | 3.5 | 4.7 | 6.4 | 7.3 | 8.1 | 8.9 | 9.6 | 10.3 | 10.8 | 11.3 | 11.8 | 15.8 | 19.0 | 21.6 | | | | | | |
| 74 | 2.6 | 3.8 | 5.3 | 6.5 | 7.4 | 8.1 | 8.7 | 9.3 | 9.9 | 10.5 | 11.0 | 14.6 | 17.6 | 20.0 | 22.1 | | | | | |
| 35 | 1.7 | 2.6 | 3.6 | 4.3 | 5.0 | 5.6 | 6.1 | 6.6 | 7.1 | 7.5 | 7.9 | 10.7 | 12.8 | 14.5 | 16.0 | 17.4 | 18.5 | 19.5 | 20.5 | 21.5 |

In addition to the TBP:TOP system shown above, a liquid comprising one part DOEDTO to four parts of the following compounds were found to be acceptable. These compounds provide no migration below the temperatures shown and thus provide temperature sensitive indicating devices.

Methyl stearate — 94° F.
Methyl Palmitate — 81° F.
Ethyl Stearate — 69° F.
Methyl Myristate — 58° F.
Butyl Stearate — 54° F.
Dimethyl Phthalate — 30° F.

Table III below shows migration rates with systems employing pads of 20 mil Bluebird Blotting Paper as the porous matrix and a liquid comprising DOEDTO in methyl stearate and DOEDTO in ethyl stearate. The concentration of liquid in the porous matrix is about 45 percent by weight based on the combined weight of the matrix and liquid in both cases.

TABLE III

| TIME HOURS | INCHES PENETRATION FROM FLUID SOURCE PAD | | | | | | |
|---|---|---|---|---|---|---|---|
|  | 5 | 10 | 20 | 30 | 50 | 100 | 200 |
| Methyl Stearate at 100° F. | 1.5 | 2.0 | 2.8 | 3.5 |  |  |  |
| Ethyl Stearate at 78° F. | 0.65 | 0.95 | 1.3 | 1.55 | 1.8 | 2.1 | 2.9 |

The following example illustrates particular conditions, steps, and materials within the scope of the present invention. However, this example is given only for the purpose of illustration and not limitation.

EXAMPLE

An indicator device was constructed substantially as shown in FIG. 1. Covers 16 and 30 were cut to size from 20 mil white card stock and laid end to end. A strip of clear plastic film was cut to size and heat sealed to the covers with a hand held electrically heated platen to form cover liners 18 and 32. The film prevents liquid saturant from soaking into the card stock covers and also forms a hinge holding covers 16 and 30 together.

A porous fluid source pad 26 was prepared by cutting to size a piece of 20 mil blotting paper (Bluebird Blotting Paper, Sorg Paper Company). The paper pad was weighed and a liquid comprising (a) 94 percent of a 50:50 mixture of tributyl phosphate and trioctyl phosphate, and (b) 6 percent DOEDTO was added to the paper pad to provide a fluid source having 45 percent liquid saturant based on the combined weight of the pad and the liquid, i.e. 45 parts liquid/55 parts pad. The liquid was placed dropwise on the paper pad and migration of the liquid within the pad quickly provided a uniform distribution of liquid saturant within the pad. The pad 26 was adhered with liquid cement to cover 28 in the position shown in FIGS. 1 and 2.

A wick 20 was cut from 20 mil Bluebird Blotting Paper in substantially the shape shown in FIG. 1. A solution of nickel rosinate was applied by spraying the end of the wick to form layer 22, the rest of the wick being shielded so as to prevent application of the nickel rosinate to the remaining areas. When dried, the nickel rosinate layer 22 was essentially the same white color as the untreated area.

The wick 20 was adhered with liquid cement to cover 14 in the position shown in FIG. 1. A separator sheet 24 was cut to size from a sheet of transparent polyester film and positioned over wick 20 as shown in FIG. 1 so as to prevent the contact of pad 26 with wick 20. The covers 14 and 28 were then folded together, sandwiching the separator sheet 24 between pad 26 and wick 20 and a clip 40 slipped over the hinged end of the covers to hold the combination of elements in fixed relationship.

A strip of pressure-sensitive adhesive transfer film 36 having removable protective liner 38 was applied to the outside of cover 14 to allow easy attachment to a surface.

The device was activated at 75° F. (25° C.) by removing the separator sheet. After 72 hours the characteristic purple color of the DOEDTO — nickel complex began to appear in layer 22. By the end of 98 hours about one-half of the area of layer 22 had turned purple.

What is claimed is:

1. An indicating device for indicating a selected time interval comprising, in combination, a plurality of porous fluid source pads each carrying a preselected liquid saturant material having differing melting points, a branched wick, each of said branches capable of wicking liquid saturant in liquid form from the associated porous fluid source pad the branches of said wick terminating at a common point, means for selectively regulating migration of the rate of the liquid from said fluid source pads to said wick below the migration rate provided by a free pool of the liquid, said combination including means for indicating the presence of fluid saturant at the common terminus of said wick.

2. A device according to claim 1 wherein said regulating means comprises a barrier imprevious to said liquid removably interposed between said wick and each of said associated fluid source pads, and wherein said device includes means interconnecting said fluid source pads, wick and removable barrier such that said wick and fluid source pads are brought into intimate contact upon removal of said barrier.

3. A device for indicating the passage of a selected time interval comprising, in combination, a porous fluid source pad means containing an indicating fluid, a wick of a preselected length capable of wicking fluid from said fluid source pad means, means for directing migration of said fluid through said wick to provide a visible migrating front of fluid in said wick, and meant for temporarily preventing migration of fluid from said fluid source pad means to said wick, said fluid source pad means means containing and presenting a controlled amount of fluid to said wick and containing means for selectively limiting the maximum migration rate for a given fluid below the migration rate provided by a free pool of the fluid.

4. A device according to claim 3 wherein said source pad means is a porous matrix having absorbed therein a selected concentration of a fluid or a solid capable of becoming a fluid at a given temperature.

5. A device according to claim 4 wherein said porous matrix contains a solid material having a melting point above room temperature.

6. A device according to claim 4 wherein said migration directing means comprises an elongated wick partially juxtaposed with said porous matrix whereby there can be provided a visible migrating front of fluid along a major dimension of said wick.

7. A device according to claim 6 wherein said porous matrix and said wick are absorbent paper.

8. A device according to claim 6 wherein said fluid comprises a non-aqueous liquid.

9. A device according to claim 8 wherein said nonaqueous liquid comprises tributyl phosphate.

10. An indicating device according to claim 3 wherein said means for temporarily preventing migration of fluid from said fluid source pad means to said wick comprises a removable fluid-impermeable barrier interposed between said fluid source pad means and said wick.

11. A device according to claim 3 wherein said indicating fluid carries a color forming chemical reactant system comprising dithiooxamide or an N,N'-diorgano substituted derivative thereof and wherein a color-forming coreactant metal salt is located in a portion of the wick.

12. A dry appearing, storage stable device for indicating the passage of a selected time interval, comprising, in combustion, a liquid source comprising a generally flat, porous pad containing a liquid or a solid capable of becoming a liquid at a preselected temperature, a flat elongated wick of a preselected shape partially juxtaposed over said pad, a barrier layer impervious to said liquid and removably interposed between said wick and said pad, and means interconnecting said pad, wick and barrier layer in layers, and biasing said pad and wick toward one another so that said pad and wick intimately contact one another on removal of said barrier layer, said liquid source containing means for selectively limiting the maximum migration rate of said liquid in said wick below the migration rate provided by a free pool of the liquid.

13. A device for indicating the passage of a selected time interval comprising, in combination,
 a. a channel shaped carrier comprising a base having a pair of upwardly extending side walls disposed along opposite side edges of said base, each side wall having an undulating shape defining two inwardly opening upper and lower grooves extending substantially parallel to said base and separated from one another by an inwardly extending central portion,
 b. a wick of a preselected shape seated on said base between said side walls,
 c. a fluid carrying porous pad having a thickness less than the distance between said upper and lower grooves, said pad being capable of containing and selectively presenting a controlled amount of fluid to said wick and containing means for selectively limiting the maximum migration rate for a given fluid below the migration rate provided by a free pool of the fluid, and
 d. an upper cover means received between the upper grooves of said carrier side walls in spaced relation to said base and said liquid carrying porous pad attached in underlying relation thereto, said cover means being movable from said upper to said lower grooves to bring said pad into contact with said wick whereby said wick is partially juxtaposed with said pad.

14. A device according to claim 13 wherein said side walls are capable of resiliently flexible movement relative to said base.

* * * * *

UNITED STATES PATENT AND TRADEMARK OFFICE
CERTIFICATE OF CORRECTION

PATENT NO. : 3,954,011
DATED : May 4, 1976
INVENTOR(S) : Wendell J. Manske

It is certified that error appears in the above—identified patent and that said Letters Patent are hereby corrected as shown below:

Column 7, line 46, the sentence should start with a capital letter -- [T]he preferred source ... -- .
Column 9, line 8, the sentence (and paragraph) should start with a capital letter: -- [A]lternatively, a color producing ... -- .
Column 9, approx. lines 38 and 43, (in TABLE I) the "closed" parenthesis should be inserted so the lines will read: -- Parts Pad 76.3) -- and -- 85.4) -- .
Column 10, line 7, correct the spelling of -- having -- ; and lines 11-12, insert quotes around "Bluebird Blotting Paper."
Column 11, line 10, insert quotes around "Bluebird Blotting Paper."
Column 12, line 25 (Claim 1), "the rate of" should have been inserted before "migration" instead of after so that line 25 reads -- regulating the rate of migration of the liquid from said -- ;
line 45 (in Claim 3), "meant" at the end of the line should be -- means -- .
Column 13, line 18 (in Claim 12), change "combustion" to -- combination -- .

Signed and Sealed this

Thirty-first Day of August 1976

[SEAL]

Attest:

RUTH C. MASON
Attesting Officer

C. MARSHALL DANN
Commissioner of Patents and Trademarks